J. RABENBERG.
Artificial Chicken-Mother.

No. 202,466. Patented April 16, 1878.

WITNESSES:
Chas. Nida
C. Sedgwick

INVENTOR:
J. Rabenberg
BY Munn
ATTORNEYS.

UNITED STATES PATENT OFFICE.

JOHAN RABENBERG, OF BRECKINRIDGE, MISSOURI.

IMPROVEMENT IN ARTIFICIAL CHICKEN-MOTHERS.

Specification forming part of Letters Patent No. 202,466, dated April 16, 1878; application filed December 19, 1877.

*To all whom it may concern:*

Figure 1:
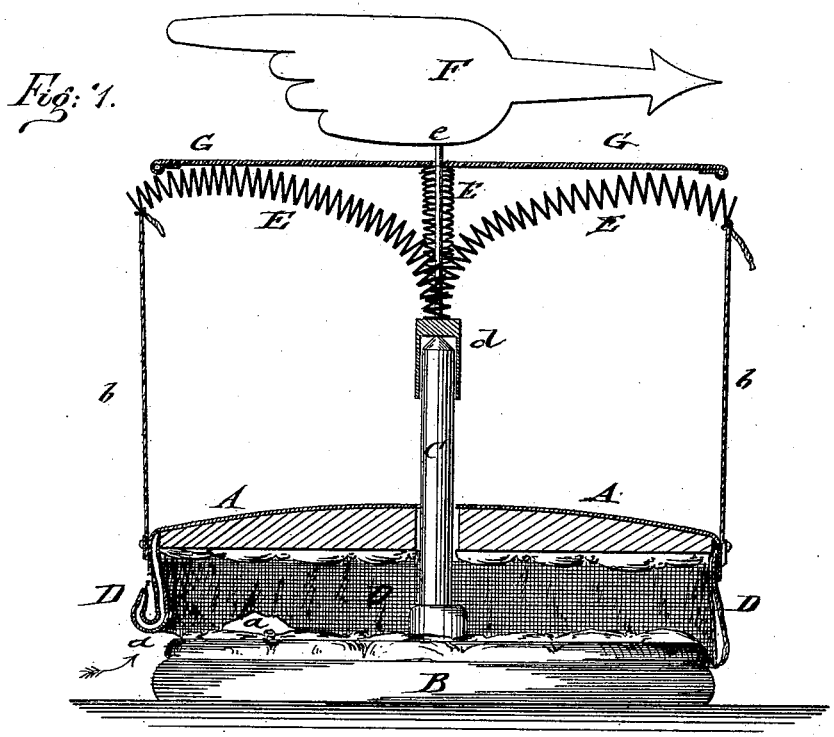
Figure 2:
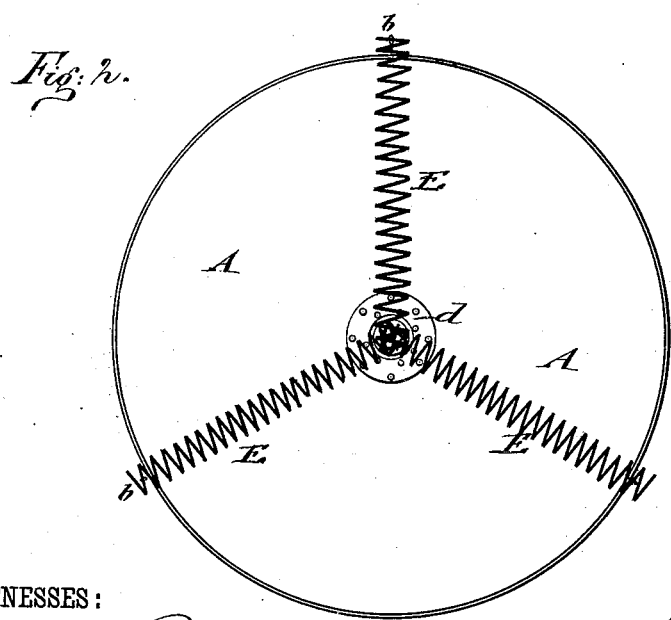

Be it known that I, JOHAN RABENBERG, of Breckinridge, in the county of Caldwell and State of Missouri, have invented a new and Improved Artificial Chicken-Mother, of which the following is a specification:

In the accompanying drawing, Figure 1 represents a vertical central section of my improved artificial mother for protecting chickens, and Fig. 2 is a plan view of the same with top part removed.

Similar letters of reference indicate corresponding parts.

This invention is intended to provide for chickens and other poultry that are hatched by incubators an artificial protecting device or mother that shelters them against the sun, wind, and rain, and furnishes a snug and warm place for them, to which they can retire as under the wings of a mother hen.

The invention will first be described in connection with the drawing, and then pointed out in the claims.

In the drawing, A represents the canopy-shaped protector or mother, that is supported on a center post, C, of a base-board, B. The surface of the base-board B, as well as the under side of the protector A, are covered with suitable stuffing of soft and warm material, between which the young poultry are kept warm.

The protector A is surrounded by a curtain, D, formed of several layers of flannel or other suitable material, and extended down to the base-board, so as to form contact therewith, and shut out the wind and rain.

At one or more points, $a$, the curtain is raised, or openings $a$ provided, for the chickens to pass in and out. The protector A is hung, by adjustable leather or other straps $b$, to spiral or other supporting-springs E, that make the protector yield to the slightest pressure, so as not to press on the chickens. The springs are attached to a center socket, $d$, which turns on the tapering top end of the center post.

To a vertical center rod, $e$, of the socket $d$ is attached a vane, F, that points in the direction of the closed part of the protector, so as to turn the same always in such a manner that the ingress and egress openings for the chickens are at the side not exposed to the wind.

A shade, G, of suitable diameter, rests on the supporting-springs below the vane, and keeps off the sun in hot weather.

This artificial mother may be made of suitable size to accommodate from one hundred to five hundred chickens, or more, and is placed with the same at any suitable place, the chickens leaving for getting their food, and returning to the folds of the same, by which they are protected against storm, rain, hail, and snow. In hot weather the sun-shade gives the chickens protection in its shadow, while in the evening they gather at the inside of the snug and comfortable protector, and are sheltered thereby in artificial manner, but in close imitation to the wings of a mother hen.

Having thus described my invention, I claim as new and desire to secure by Letters Patent—

1. The combination of the canopy A and base B, cushioned with soft material on their opposite faces, and provided with the encircling curtain D, as shown and described.

2. The combination, with the canopy A, of the straps $b$, the springs E, and the socket $d$ on the center post C, to suspend said canopy, in the manner set forth.

JOHAN RABENBERG.

Witnesses:
   MARTIN BROWN,
   N. ENGLE.